(12) United States Patent
Kleindl et al.

(10) Patent No.: US 12,330,540 B2
(45) Date of Patent: Jun. 17, 2025

(54) VEHICLE SEAT ARRANGEMENT

(71) Applicant: Bayerische Motoren Werke Aktiengesellschaft, Munich (DE)

(72) Inventors: Sylvia Kleindl, Munich (DE); Joerg Kutzschbach, Petershausen (DE); Dieter Strasser, Oberhausen (DE); Bernhard Weiler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/266,344

(22) PCT Filed: Nov. 30, 2021

(86) PCT No.: PCT/EP2021/083639
§ 371 (c)(1),
(2) Date: Jun. 9, 2023

(87) PCT Pub. No.: WO2022/122485
PCT Pub. Date: Jun. 16, 2022

(65) Prior Publication Data
US 2024/0101000 A1      Mar. 28, 2024

(30) Foreign Application Priority Data
Dec. 11, 2020   (DE) .................... 10 2020 133 117.7

(51) Int. Cl.
*B60N 2/18*           (2006.01)
*B60N 2/22*           (2006.01)

(52) U.S. Cl.
CPC ......... *B60N 2/1842* (2013.01); *B60N 2/2245* (2013.01)

(58) Field of Classification Search
CPC ...... B60N 2/1842; B60N 2/2245; B60N 2/20; B60N 2/22; B60N 2/203; B60N 2/206; B60N 2/10
See application file for complete search history.

(56) References Cited

U.S. PATENT DOCUMENTS

| | | | | |
|---|---|---|---|---|
| 2,795,265 A | * | 6/1957 | Albrecht | B60N 2/12 297/341 |
| 4,887,864 A | * | 12/1989 | Ashton | B60N 2/23 297/375 |

(Continued)

FOREIGN PATENT DOCUMENTS

| | | |
|---|---|---|
| DE | 30 25 811 A1 | 3/1981 |
| DE | 91 09 022 U1 | 10/1991 |

(Continued)

OTHER PUBLICATIONS

International Search Report (PCT/ISA/210) issued in PCT Application No. PCT/EP2021/083639 dated Feb. 18, 2022 with English translation (5 pages).

(Continued)

*Primary Examiner* — Eret C McNichols
(74) *Attorney, Agent, or Firm* — Crowell & Moring LLP

(57) ABSTRACT

A vehicle seat arrangement has at least two seats, which are arranged next to one another in a transverse direction of the seat on a common seat bench, and a common seat backrest that can be inclined about a transverse axis. The common seat backrest is adjustable from an upright seating position into a resting or reclined position which is inclined towards the rear.

15 Claims, 2 Drawing Sheets

(56) References Cited

U.S. PATENT DOCUMENTS

| | | | | |
|---|---|---|---|---|
| 8,382,057 | B2* | 2/2013 | Napau | B60N 2/0875 |
| | | | | 297/344.11 |
| 8,403,415 | B2* | 3/2013 | Lawson | B64D 11/064 |
| | | | | 297/354.13 |
| 8,439,448 | B2* | 5/2013 | Murthy | B60N 2/065 |
| | | | | 297/473 |
| 8,465,096 | B2* | 6/2013 | Sayama | B60N 2/2362 |
| | | | | 296/65.09 |
| 8,528,981 | B2* | 9/2013 | Funk | B60N 2/686 |
| | | | | 297/216.13 |
| 9,085,247 | B2* | 7/2015 | Wilfer | B60N 2/3011 |
| 9,352,676 | B1* | 5/2016 | Wright | B60N 2/2893 |
| 9,376,044 | B2* | 6/2016 | Fujita | B60N 2/1615 |
| 9,399,414 | B2* | 7/2016 | Prause | B60N 2/2356 |
| 9,399,415 | B2* | 7/2016 | Serber | B60N 2/42763 |
| 9,616,779 | B2* | 4/2017 | Barzen | B60N 2/366 |
| 9,688,164 | B2* | 6/2017 | Vikstrom | B60N 2/067 |
| 9,987,953 | B2* | 6/2018 | Kimura | B60N 2/919 |
| 10,137,811 | B2* | 11/2018 | Akaike | B60N 2/68 |
| 10,173,555 | B2* | 1/2019 | Szlag | B60N 2/065 |
| 10,195,963 | B2* | 2/2019 | Flick | B60N 2/0715 |
| 10,202,056 | B2* | 2/2019 | Zimmerman, II | B60N 2/366 |
| 10,232,744 | B2* | 3/2019 | Meister | B64D 11/0642 |
| 10,286,815 | B2* | 5/2019 | Line | B60N 2/914 |
| 10,525,852 | B2* | 1/2020 | Ma | B60N 2/3013 |
| 10,717,373 | B2* | 7/2020 | Watanabe | B60N 2/0881 |
| 10,889,207 | B2* | 1/2021 | Emrich | B60N 2/005 |
| 10,953,773 | B2* | 3/2021 | Moon | B60N 2/12 |
| 11,065,996 | B2* | 7/2021 | Ito | B60N 2/02246 |
| 11,148,571 | B2* | 10/2021 | Line | B60N 2/20 |
| 11,148,811 | B1* | 10/2021 | Eisele | B64D 11/0619 |
| 11,351,957 | B2* | 6/2022 | Setterberg | B60N 2/688 |
| 11,639,151 | B2* | 5/2023 | Jovicevic | B60N 2/688 |
| | | | | 280/801.1 |
| 12,109,917 | B2* | 10/2024 | Legh | B60N 2/1842 |
| 12,139,059 | B2* | 11/2024 | Gropp | B60N 2/3011 |
| 2006/0055214 | A1 | 3/2006 | Serber | B60N 2/42763 |
| | | | | 297/216.1 |
| 2008/0191539 | A1* | 8/2008 | Teufel | B60N 2/2245 |
| | | | | 297/354.1 |
| 2009/0001795 | A1* | 1/2009 | Homier | B60N 2/22 |
| | | | | 297/340 |
| 2012/0056457 | A1* | 3/2012 | Straham, Jr. | B60N 2/75 |
| | | | | 297/250.1 |
| 2012/0235006 | A1* | 9/2012 | Sailer | B60N 2/01 |
| | | | | 248/429 |
| 2013/0147248 | A1* | 6/2013 | Wolf | B60N 2/10 |
| | | | | 297/325 |
| 2015/0232010 | A1* | 8/2015 | Sato | B60N 2/686 |
| | | | | 297/452.18 |
| 2018/0079333 | A1* | 3/2018 | Ma | B60N 2/3065 |
| 2020/0223342 | A1* | 7/2020 | Ito | B60N 2/995 |
| 2020/0398713 | A1* | 12/2020 | Behrens | B60N 2/22 |
| 2021/0155137 | A1* | 5/2021 | Line | B60N 2/02246 |
| 2021/0245636 | A1* | 8/2021 | Osa | B60N 2/68 |
| 2021/0291699 | A1 | 9/2021 | Kostin | |
| 2022/0332233 | A1* | 10/2022 | Gropp | B60N 2/3011 |

FOREIGN PATENT DOCUMENTS

| | | | | |
|---|---|---|---|---|
| DE | 43 43 108 C1 | 2/1995 | | |
| DE | 10 2009 041 655 A1 | 3/2011 | | |
| DE | 10 2007 005 209 B4 | 4/2012 | | |
| DE | 10 2015 218 357 B4 | 1/2018 | | |
| DE | 10 2017 208 688 A1 | 11/2018 | | |
| DE | 10 2018 118 398 B4 | 10/2020 | | |
| EP | 3056393 A1 * | 8/2016 | | B60N 2/68 |
| EP | 3 696 013 A1 | 8/2020 | | |
| FR | 2 745 244 A1 | 8/1997 | | |
| FR | 3019501 A1 * | 10/2015 | | B60N 2/01583 |
| GB | 2 062 562 A | 5/1981 | | |
| WO | WO 2014/192095 A1 | 12/2014 | | |

OTHER PUBLICATIONS

German-language Written Opinion (PCT/ISA/237) issued in PCT Application No. PCT/EP2021/083639 dated Feb. 18, 2022 (6 pages).
German-language Search Report issued in German Application No. 10 2020 133 117.7 dated Jan. 21, 2021 with partial English translation (11 pages).

* cited by examiner

VEHICLE SEAT ARRANGEMENT

TECHNICAL FIELD

The invention relates to a vehicle seat arrangement having at least two seating positions arranged next to one another in a seat transverse direction on a common bench seat. It also relates to a vehicle having at least one vehicle seat arrangement of this kind.

BACKGROUND AND SUMMARY

Comfortably adjustable vehicle seats, the backrest of which is adjustable into a rearwardly inclined resting or reclined seat position, are currently usually provided only in the first, front row of seats of a vehicle. Only in top range vehicles and in luxury vehicles are such vehicle seats also available for a second row of seats, when individual seats are provided in the second row of seats. However, it is very complex to install longitudinally adjustable individual seats, since, for each individual seat, a separate seat bracket with integrated longitudinal adjustability has to be provided.

DE 10 2017 208 688 A1 discloses a vehicle seat in the form of an individual seat, the seat surface of which pivots upward with its front end, remote from the backrest, when the backrest is pivoted rearward into a resting or reclined seat position.

An object of the invention is to improve a vehicle seat arrangement of the generic type such that it is more cost-effective to produce and is therefore able to be installed even in lower cost vehicles. A further object is to specify a vehicle having such a cost-effective vehicle seat arrangement.

This object is achieved by the features of the independent claim.

A first vehicle seat arrangement having at least two seating positions arranged next to one another in a seat transverse direction on a common bench seat, and a common backrest that is inclinable about a transverse axis is characterized according to the invention in that the common backrest is adjustable from an upright seat position into a rearwardly inclined resting or reclined seat position.

A second, alternative vehicle seat arrangement having at least two seating positions arranged next to one another in a seat transverse direction on a common bench seat is characterized according to the invention in that each seating position is assigned a backrest that is inclinable individually about a transverse axis and is adjustable in each case from an upright seat position into a rearwardly inclined resting or reclined seat position.

The solutions according to the invention allow passengers in the second row of seats or in a rear row of seats of a vehicle to also travel in a relaxed fashion and to rest or sleep even when this vehicle is not equipped with individual seats in the second or rear row of seats.

Further preferred and advantageous design features of the vehicle seat arrangements according to the invention are the subject matter of the dependent claims.

Preferably, in both embodiments, provision is made for the bench seat to be pivotable upward with its front end, remote from the respective backrest, about a rear transverse axis, wherein the bench seat is pivoted upward with its front end when at least one of the backrests has been inclined rearward into the resting or reclined seat position.

Alternatively, it is advantageous in both variants of the invention when the bench seat is provided, at each of the seating positions, with a seat cushion which is pivotable upward in each case individually, at its front end remote from the respective backrest, about a rear transverse axis, wherein the respective seat cushion is pivoted upward with its front end when the backrest assigned thereto has been inclined rearward into the resting or reclined seat position.

Preferably, for each seating position, a restraining device, in particular a seat belt, integrated into the bench seat and/or the backrest is provided.

Also preferably, for each seating position, a calf support that is able to be extended or pivoted out forward from the bench seat is provided.

The part of the object directed to the vehicle is achieved by a vehicle, in particular by a motor vehicle, which is equipped with at least one vehicle seat arrangement according to the invention.

Such a vehicle is cost-effectively equipped, in a middle row of seats or the rear row of seats, with resting or reclining seats, without there being a need for complicated separate seat brackets as seat substructures, as is necessary in the case of individual seats.

Although the vehicle seat arrangement according to the invention can also be used in a front row of seats, it is preferably arranged in a middle or rear row of seats of the vehicle.

Preferably, the vehicle seat arrangement is mounted in the vehicle so as to be longitudinally movable in a bench seat rail arrangement having at least one bench-seat-side upper rail and at least one vehicle-structure-side lower rail, and is provided with a longitudinal adjustment device common to both seating positions.

A vehicle is particularly preferred in which the at least one lower rail and the at least one upper rail, assigned thereto, of the bench seat rail arrangement are able to be uncoupled from one another in the event of a vehicle collision, and in which the bench seat rail arrangement has at least one force limiting device that acts between the bench seat and the vehicle structure and is configured to decelerate a collision-related relative movement between the respective upper rail and the respective lower rail.

A vehicle seat arrangement according to the invention having a bench seat with a reclining function in the second or a rear row of seats with an integrated belt system and crash absorber in the attachment to the vehicle structure and with expanded seat inclination adjustment in combination with a calf support provides at least two people with the opportunity to lie and rest safely in the vehicle rear when traveling—analogously to the reclining seats in the first row of seats. The comfort when inclined is achieved particularly advantageously in that the torso angle, that is to say the angle between the seat surface and the backrest surface, is set to about 60° and an additional calf support is extended. Safety is provided by a restraining system with seat belts integrated in the seats, a crash absorber and a correspondingly positioned seat surface to avoid submarining and to comply with biomechanical limit values.

From the respective seat position, when the backrest is being inclined rearward into the resting or reclined position, either the front end of the entire bench seat or the front end of the respective seat cushion is inclined upward, with the result that the body of a passenger sitting on the vehicle seat is supported in the resting or reclined position against the inclined seat surface in the event of a frontal collision and thus the body is prevented from slipping through under a fastened seat belt, known as "submarining".

Preferred exemplary embodiments of the invention with additional design details and further advantages are explained and described in more detail in the following text with reference to the appended drawings.

DETAILED DESCRIPTION OF THE DRAWINGS

Figure 1:
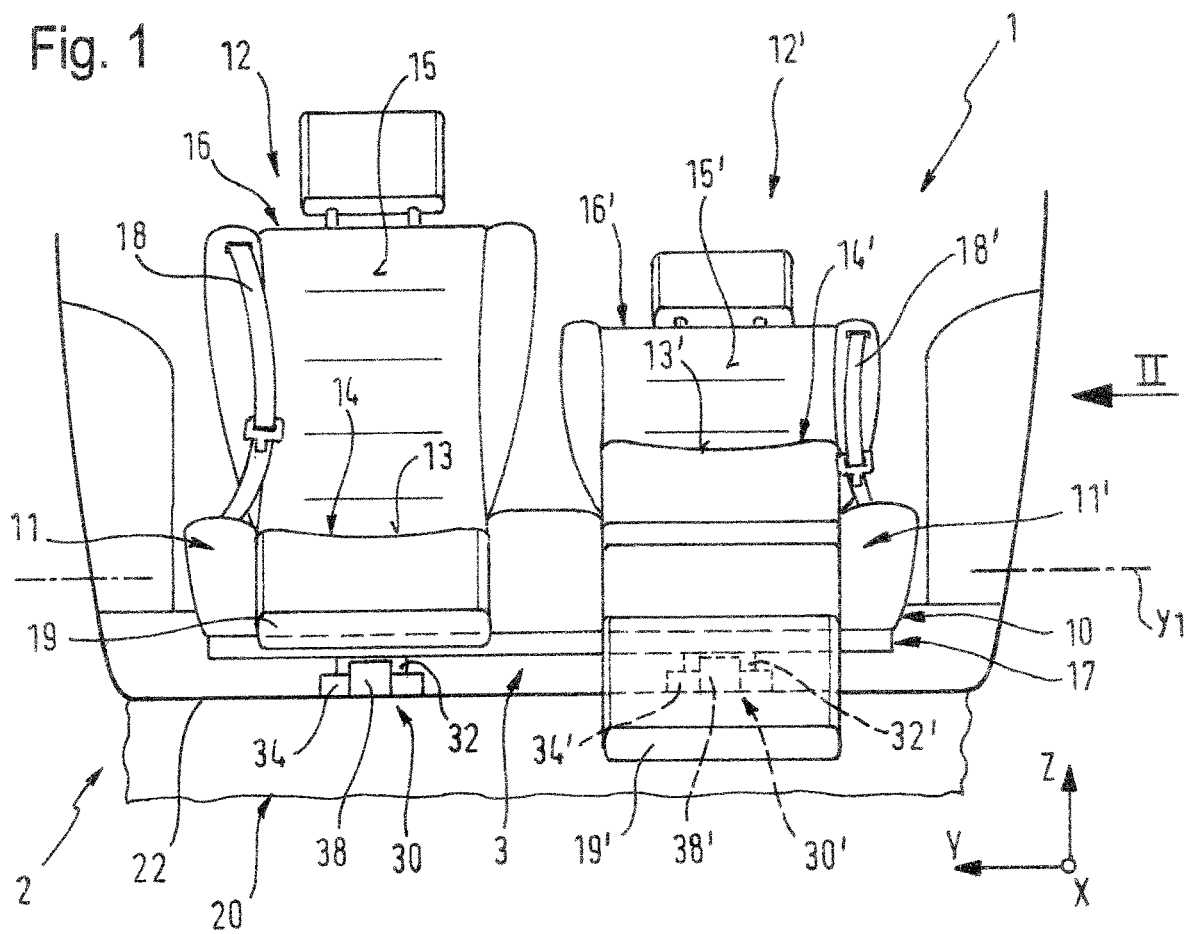
FIG. 1 is a view of a vehicle seat arrangement according to an embodiment of the invention in the second row of seats of a vehicle.

FIG. 1 shows a vehicle seat arrangement 1 in the second row of seats of a vehicle 2, which is represented here only by an interior floor 22 of the vehicle structure 20. The view of the vehicle seat arrangement 1 is directed from front to rear counter to the direction of travel F (FIG. 2).

The vehicle seat arrangement 1 illustrated in FIG. 1 has two seating positions 12, 12' which are arranged next to one another and the lower seat parts 11, 11' of which are formed in a common bench seat 10. Each of the lower seat parts 11, 11' has an upper seat surface 13, 13' which is formed on a seat cushion 14, 14'.

Figure 2:
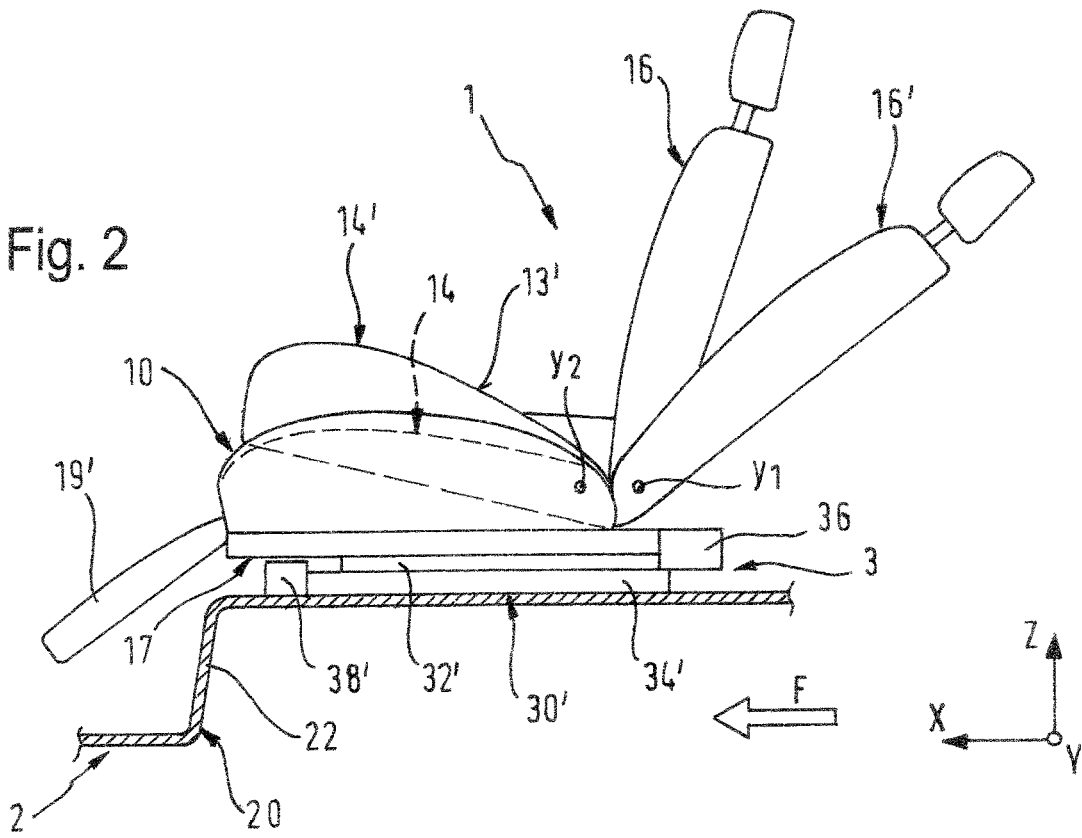
FIG. 2 is a side view of the vehicle seat arrangement in the direction of the arrow II in FIG. 1.

Each of the lower seat parts 11, 11' is assigned a backrest 16, 16' which is inclinable individually about a common transverse axis $y_1$ and has a respective front backrest surface 15, 15', wherein the inclination of the two backrests 16, 16' is adjustable independently of one another between an upright seat position, as is shown in FIG. 2 for the right-hand backrest 16 in the direction of travel F, and a greatly inclined resting or reclined seat position, as is shown in FIG. 2 for the left-hand backrest 16' in the direction of travel F. The inclination angle between the seat surface 13, 13' and the backrest surface 15, 15' is at most 60°, and preferably lies in the range from 50° to 60° in the resting or reclined position. A respective seat belt 18, 18' is integrated into the associated backrest 16, 16' and the bench seat 10 and thus forms a restraining device for a respective vehicle passenger.

The seat surface 13, 13' of each seating position 12, 12' is arranged with the associated seat cushion 14, 14' pivotable in the bench seat 10 about a common second transverse axis $y_2$ that extends in the vehicle transverse direction Y. The second transverse axis $y_2$ is located in the rear part of the respective lower seat part 11, 11', such that the front region, remote from the backrest 16, 16', of the respective seat cushion 14, 14' is pivotable upward. To this end, it is possible for example for pneumatic actuation by means of an airbag or mechanical actuation (not shown) to be provided. The front region of the respective seat cushion 14, 14' can be raised automatically for example by means of a mechanical actuating device when the backrest 16, 16' is pivoted into its resting or reclined position, as is apparent in FIG. 2. Alternatively, the pivoting up of the front region of the respective seat cushion 14, 14' in the event of a collision can be effected by an airbag (not shown in the figures) that is arranged beneath the seat cushion and is triggered in the event of a collision and pivots the front region of the seat cushion 14, 14' upward. The pivoted-up seat cushion 14, 14' prevents submarining of a passenger who is sitting on the vehicle seat in question and is restrained by means of the seat belt 18, 18'.

The common bench seat 10 is mounted so as to be movable in the vehicle longitudinal direction X on a right-hand (as seen in the direction of travel F) bench seat rail arrangement 30 and a left-hand (as seen in the direction of travel F) bench seat rail arrangement 30'. To this end, a respective lower rail 34, 34' is provided, which is fixedly connected to the vehicle structure 20, for example to the interior floor 22. A respective upper rail 32, 32', which is fixedly connected to a bracket 17 of the bench seat 10, is mounted so as to be longitudinally movable in the lower rail 34, 34'.

As is schematically illustrated in FIG. 2, a force limiting device 38, 38', which is connected to the vehicle structure 20 and to the respective lower rail 34, 34', is provided at the front end of the respective lower rail 34, 34'. In the event of a collision, the usual locking between the upper rail 32, 32' and the associated lower rail 34, 34' can be undone such that the respective lower rail 34, 34' and its respective upper rail 32, 32' are uncoupled from one another and the entire bench seat 10 with the passengers sitting or lying thereon can slide forward on account of inertia. In the process, the respective upper rail 32, 32' strikes the force limiting device 38, 38' and the latter damps the forward movement of the bench seat 10 and decelerates this movement.

FIG. 2 likewise illustrates only schematically an adjustment drive 36, which, in a usual manner, allows electronic longitudinal adjustment of the entire bench seat 10 relative to the vehicle structure 20. The adjustment drive 36 can be provided on one bench seat rail arrangement 30' or on both bench seat rail arrangements 30, 30'.

Finally, it is also apparent from FIGS. 1 and 2 that a calf support 19, 19' that is able to be extended forward and lowered downward from the bench seat 10 is provided in the seat bracket 17 of the bench seat 10 and/or in the respective lower seat part 11, 11' beneath the respective seat cushion 14, 14', the calf support supporting the calves of a passenger sitting on the seat in the resting or reclined position (FIG. 2).

The particularly preferred embodiment, shown in FIGS. 1 and 2, of the vehicle seat arrangement 1 combines a bench seat 10 that is continuous in the vehicle transverse direction Y with backrests 16, 16' that are inclinable individually for each seating position 12, 12'. The two seating positions 12, 12' are longitudinally movable together, since they are arranged together on the bench seat 10, but their backrests are individually inclinable, wherein the seat cushions 14, 14' are also pivotable upward individually with their front end.

Figure 3:
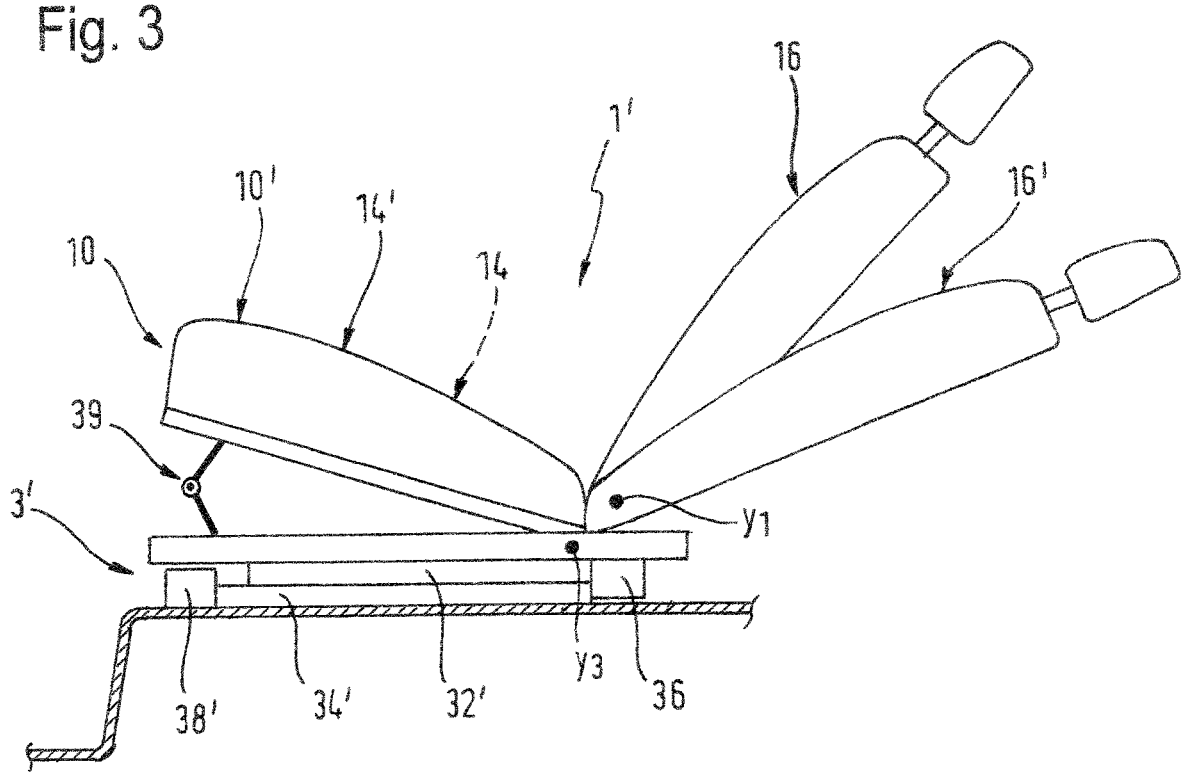
FIG. 3 is a side view of a first alternative embodiment of a vehicle seat arrangement.

A simplified embodiment of a vehicle seat arrangement 1' is illustrated in FIG. 3. The inclinability of the backrests 16, 16' and the longitudinal movability of the vehicle seat arrangement 1' as a whole corresponds to that of the exemplary embodiment in FIGS. 1 and 2. However, in the vehicle seat arrangement 1' in FIG. 3, the seat cushions 14, 14' are formed fixedly in the upholstery 10' of the lower seat part 11, 11' and the entire bench seat 10 is pivotable upward with its front end about a transverse axis $y_3$ located in the rear region of the bench seat 10. To this end, a mechanism 39, which is illustrated only symbolically in FIG. 3 and raises the front end of the bench seat 10 when at least one of the backrests 16, 16' is being inclined into the resting or reclined position, is provided in the seat bracket 3'. In this way, submarining of restrained passengers sitting on the seating positions 12, 12' is prevented.

Figure 4:
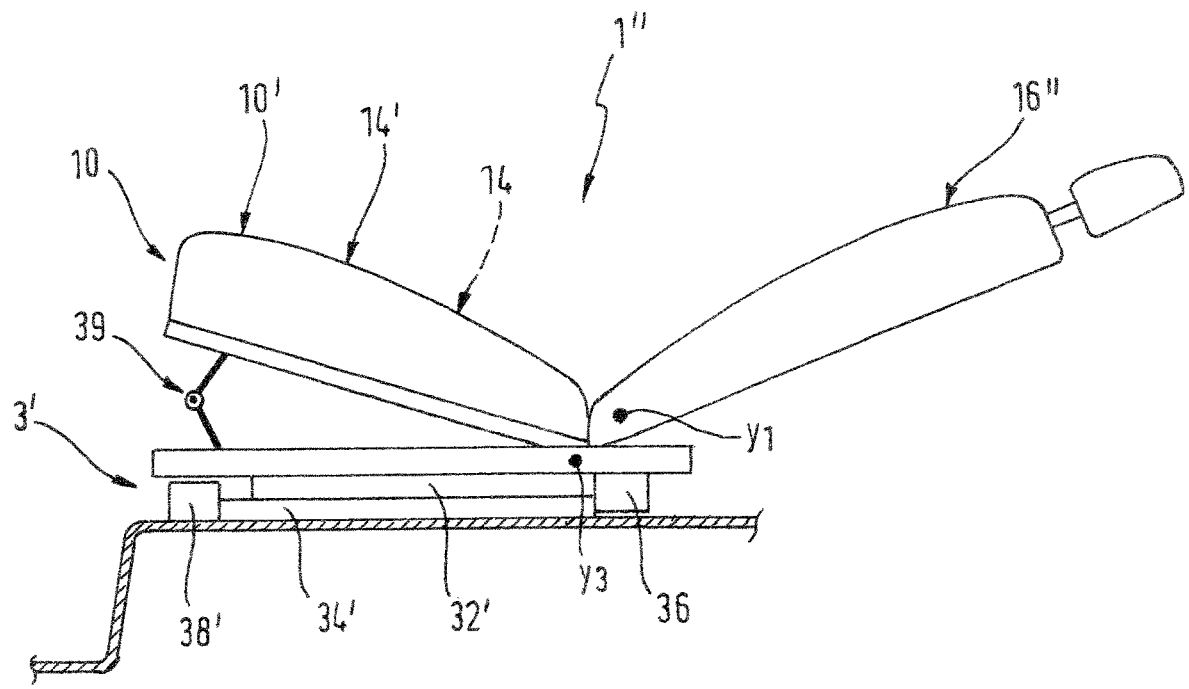
FIG. 4 is a side view of a second alternative embodiment of a vehicle seat arrangement.

A further, greatly simplified embodiment of a vehicle seat arrangement 1" is illustrated in FIG. 4. Apart from the backrest 16", this vehicle seat arrangement 1" corresponds to the vehicle seat arrangement in FIG. 2. However, separate backrests are not provided in the simplified embodiment in FIG. 4, but rather only a continuous backrest 16" common to both seating positions 12, 12' is provided, which, however, is also inclinable to the same extent between an upright seat position and a rearwardly inclined resting or reclined position, as has already been described in conjunction with the other vehicle seat arrangements 1, 1'.

The invention is not limited to the above exemplary embodiment, which serves merely to give a general explanation of the core idea of the invention. Rather, in line with the scope of protection, the apparatus according to the invention can also take on configurations other than those described above. In this case, the apparatus can in particular have features which represent a combination of the respective individual features of the claims.

Reference signs in the claims, the description and the drawings serve merely to give a better understanding of the invention and are not intended to limit the scope of protection.

LIST OF REFERENCE SIGNS

1 Vehicle seat arrangement
1' Vehicle seat arrangement
1" Vehicle seat arrangement
1'" Vehicle seat arrangement
2 Vehicle
3 Seat bracket
3' Seat bracket
10 Bench seat
10' Upholstery
11 Seat parts
11' Seat parts
12 Seating position
12' Seating position
13 Seat surface
13' Seat surface
14 Seat cushion
14' Seat cushion
15 Backrest surface
15' Backrest surface
16 Backrest
16' Backrest
16" Backrest
17 Bracket
18 Restraining device
18' Restraining device
19 Calf support
19' Calf support
20 Vehicle structure
22 Interior floor
30 Bench seat rail arrangement
30' Bench seat rail arrangement
32 Upper rail
32' Upper rail
34 Lower rail
34' Lower rail
36 Adjustment drive
38 Force limiting device
38' Force limiting device
39 Mechanism
F Direction of travel
X Vehicle longitudinal direction
Y Seat transverse direction
$y_1$ Transverse axis
$y_2$ Transverse axis
$y_3$ Transverse axis

The invention claimed is:

1. A vehicle seat arrangement, comprising:
a common bench seat having at least two seating positions arranged next to one another in a seat transverse direction on the common bench seat, wherein the common bench seat and the at least two seating positions are moveable longitudinally together;
wherein each of the at least two seating positions is assigned a separate backrest that is inclinable individually about a transverse axis and is adjustable in each case from an upright seat position into a rearwardly inclined resting or reclined seat position; and,
wherein the common bench seat is pivotable upward with its front end, remote from the respective backrest, about a rear transverse axis, and
the common bench seat is pivoted upward with its front end when at least one of the backrests has been inclined rearward into the resting or reclined seat position.

2. The vehicle seat arrangement according to claim 1, wherein
the common bench seat is provided, at each of the at least two seating positions, with a separate seat cushion which is pivotable upward in each case individually, at its front end remote from the respective backrest, about a rear transverse axis, and
the respective seat cushion has its front end pivoted upward when the backrest assigned thereto has been inclined rearward into the resting or reclined seat position.

3. The vehicle seat arrangement according to claim 1, wherein
for each of the at least two seating positions, a restraining device is integrated into at least one of the common bench seat and the respective backrest.

4. The vehicle seat arrangement according to claim 1, wherein
for each of the at least two seating positions, a separate calf support is provided that is able to be extended or pivoted individually out forward from the common bench seat.

5. A vehicle comprising a vehicle seat arrangement according to claim 1.

6. The vehicle according to claim 5, wherein
the vehicle seat arrangement is arranged in a middle or rear row of seats of the vehicle.

7. The vehicle according to claim 6,
the vehicle seat arrangement is mounted in the vehicle so as to be longitudinally movable in a bench seat rail arrangement having at least one bench-seat-side upper rail and at least one vehicle-structure-side lower rail, and is provided with a longitudinal adjustment device common to both seating positions.

8. The vehicle according to claim 7, wherein
the at least one lower rail and the at least one upper rail, assigned thereto, of the bench seat rail arrangement are able to be uncoupled from one another in an event of a vehicle collision, and
the bench seat rail arrangement has at least one force limiting device that acts between the bench seat and the vehicle structure and is configured to decelerate collision-related relative movement between the respective upper rail and the respective lower rail.

9. A vehicle seat arrangement, comprising:
a common bench seat having at least two seating positions arranged next to one another in a seat transverse direction on the common bench seat, wherein the common bench seat and the at least two seating positions are moveable longitudinally together;
wherein each of the at least two seating positions is assigned a separate backrest that is inclinable individually about a transverse axis and is adjustable in each case from an upright seat position into a rearwardly inclined resting or reclined seat position; and, wherein the common bench seat is provided, at each of the at least two seating positions, with a separate seat cushion which is pivotable upward in each case individually, at its front end remote from the respective backrest, about a rear transverse axis, and the respective seat cushion has its front end pivoted upward when the backrest assigned thereto has been inclined rearward into the resting or reclined seat position.

10. The vehicle seat arrangement according to claim 9, wherein for each of the at least two seating positions, a restraining device is integrated into at least one of the common bench seat and the respective backrest.

11. The vehicle seat arrangement according to claim 9, wherein for each of the at least two seating positions, a separate calf support is provided that is able to be extended or pivoted individually out forward from the common bench seat.

12. A vehicle comprising a vehicle seat arrangement according to claim 9.

13. The vehicle according to claim 12, wherein the vehicle seat arrangement is arranged in a middle or rear row of seats of the vehicle.

14. The vehicle according to claim 13, the vehicle seat arrangement is mounted in the vehicle so as to be longitudinally movable in a bench seat rail arrangement having at least one bench-seat-side upper rail and at least one vehicle-structure-side lower rail, and is provided with a longitudinal adjustment device common to both seating positions.

15. The vehicle according to claim 14, wherein the at least one lower rail and the at least one upper rail, assigned thereto, of the bench seat rail arrangement are able to be uncoupled from one another in an event of a vehicle collision, and the bench seat rail arrangement has at least one force limiting device that acts between the bench seat and the vehicle structure and is configured to decelerate collision-related relative movement between the respective upper rail and the respective lower rail.

* * * * *